Figure 1:
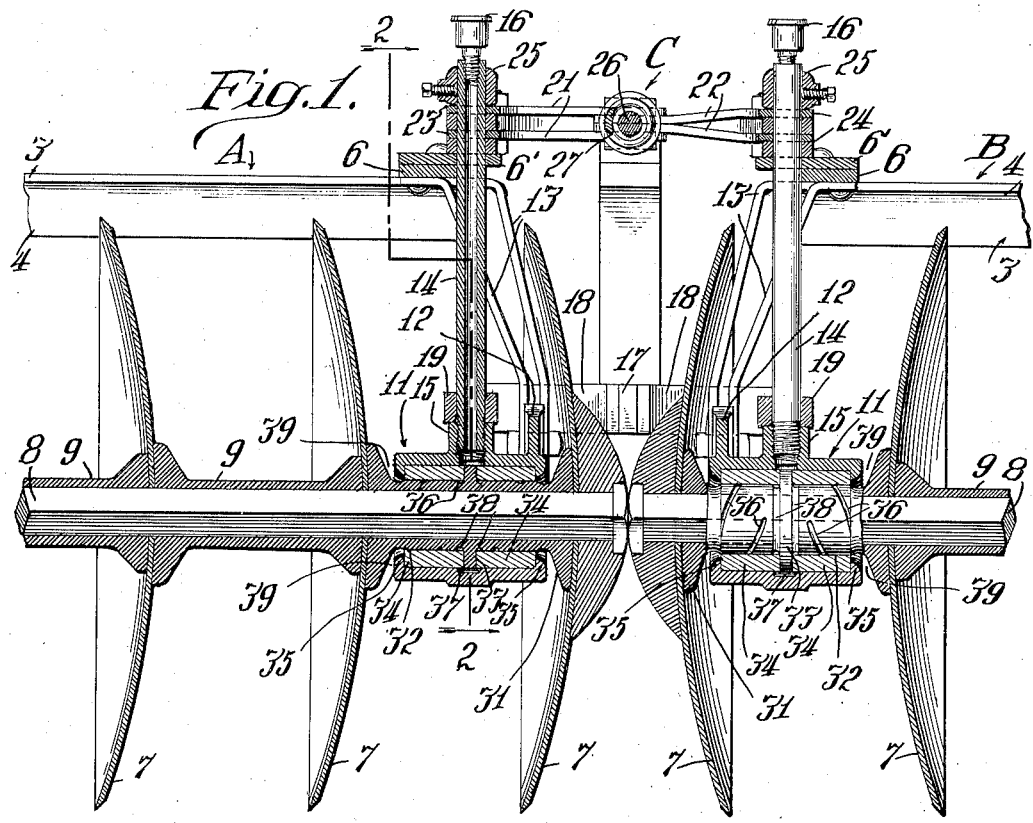

Aug. 28, 1934.  C. H. WHITE  1,971,547

BEARING

Original Filed Oct. 13, 1928

Inventor
Charles H. White

Witness
Milton Lenoir

By Brown, Jackson, Boettcher & Dienner
Attorneys

Patented Aug. 28, 1934

1,971,547

UNITED STATES PATENT OFFICE 1,971,547

BEARING

Charles H. White, Moline, Ill., assignor to Deere & Company, Moline, Ill., a corporation of Illinois Original application October 13, 1928, Serial No. 312,325, now Patent No. 1,941,504, dated January 2, 1934. Divided and this application September 16, 1929, Serial No. 392,959

7 Claims. (Cl. 308—161)

This invention relates to bearings and more particularly to bearings for disc harrows in general, certain features of the present construction also having particular application to harrows of the character disclosed in my copending application, Serial No. 312,325, filed October 13, 1928, now Patent No. 1,941,504, Jan. 2, 1934, of which this application is a division.

One of the detrimental factors in the operation of disc harrows is the severe end thrust imposed on the axles due to the transverse component transmitted to the harrow structure by the engagement of the discs with the ground.

Inasmuch as the greater portion of the axial thrust component must be borne by the axle bearings the latter must be of such a construction as to be capable of sustaining the severe thrust imposed thereon. Another detrimental factor in the operation of the harrow is the accumulation of dirt at the bearings and the subsequent entry of dirt particles into the bearing housings and the destructive effect of the dirt particles on the bearing surfaces.

With the above in view, I have provided a bearing comprising a housing having a sleeve therein provided with a centrally disposed radial thrust collar formed integral therewith. Bearing blocks are positioned in the housing to bear radially on the sleeve and are retained in the housing by inwardly disposed end flanges on the housing. The inner surface of the housing and the outer surfaces of the bearing blocks are of polygonal shape so as to prevent relative rotation between the blocks and housing. The inner ends of the bearings bear upon the thrust collar on either side thereof, insuring thrust engaging surfaces for acute or obtuse angling of the gangs of the harrow, that is, end thrust imposed upon the axle from either side will be taken up by the thrust collar. The bearing blocks are preferably of wood so that they may be replaced as cheaply as possible. Due to this construction of the bearing, the blocks are reversible so that the blocks given the greater thrust wear may be replaced by those given the lesser and vice versa.

To insure of longer wearing life against dirt particles, I have made the bearing housing flanges and bearing sleeves of a unique construction. The housing flanges are tapered inwardly while the bearing sleeve ends adjacent the ends of the housing are tapered or flared outwardly with the space between the tapering portions formed thereby diverging radially outwardly away from the surface of the bearing sleeve. Hence any dirt thrown up by the discs above the bearing cannot readily work its way into the ends of the bearing as the taper converges in this direction. As the dirt revolves with the bearing sleeve around to the underside of the sleeve, it can readily drop out as the taper diverges outwardly and down. To further insure against destruction of the smooth bearing surfaces by dirt which may be forced into the ends of the bearing housing, for example, by pressure exerted by the ground when the harrow becomes mired on occasion, the bearing sleeve is provided with helical grooves tending to convey dirt particles outwardly away from the thrust collar.

While I have shown the bearing as applied to the disc harrow disclosed in the above noted application, the use of the bearing is not limited thereto as it may be employed on any type of disc harrow.

With the above in view, it is the main object of this invention to provide a durable and efficient bearing for the implements of the class described.

Another object is the provision of a bearing which may be easily assembled and disassembled.

A further object is the provision of a novel bearing of simple and substantial construction which is adapted to take up end thrust of an axle to which it is secured, and the thrust sustaining surfaces of which are spaced inwardly from the ends of the bearing and are practically inaccessible to dirt.

Another object is the provision of novel means by which particles of dirt will be conveyed outwardly towards the outer end of the bearing, away from the thrust surfaces.

A further object is the provision of the spindle sleeve for a bearing of the character described which functions to retain the discs in spaced relation with each other and at the same time retain the bearing in fixed relation to the same.

Another object is the provision of means on the bearing housing and bearing sleeve which will prevent the accumulation and entry of dirt at the ends of the housing.

A further object is the provision of reversible bearing elements within the bearing housing so that elements given greater wear may be readily replaced by elements given lesser wear.

Figure 2:
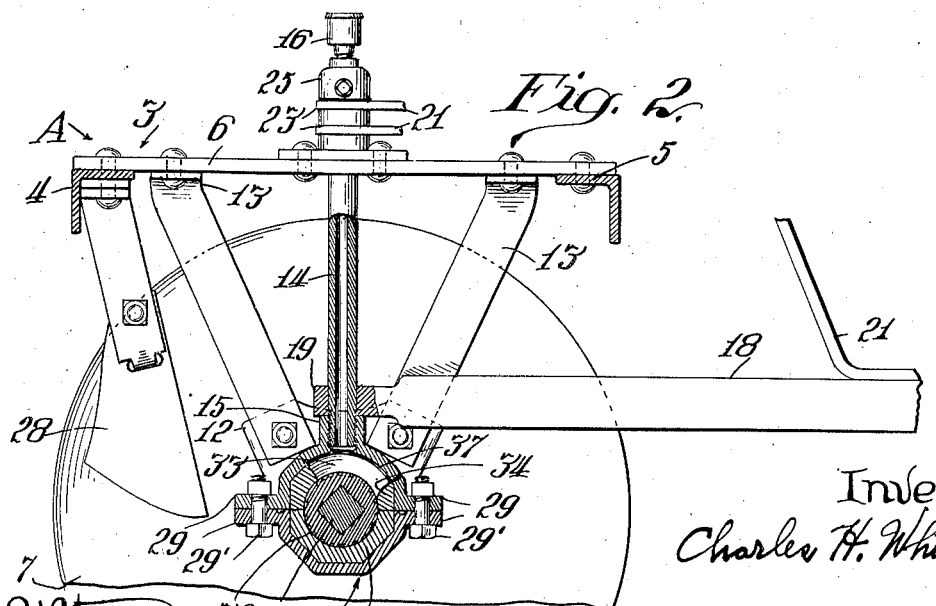

Other and further objects will appear from the following detailed description of an embodiment of my invention illustrated in the accompanying drawing, in which:

Figure 1 is a vertical axial sectional view taken through the inner end of the two gangs of my improved harrow and showing the two adjacent inner end bearings in section, one section being through the spindle sleeve and the other only through the bearing blocks and housing; and Figure 2 is a transverse sectional view taken along the line 2—2 of Figure 1.

As illustrated in Figure 1 of the drawing, the exemplary construction of harrow shown comprises two gangs A and B, which are disposed substantially abreast of each other in oppositely extending relation. Each of these gangs comprises a frame 3 formed of two parallel longitudinally extending angle bars 4 and 5 which are cross-connected at spaced intervals by transverse bars 6 (only one bar of each gang being shown). The two gangs are substantial duplicates, with the exception that the respective discs 7 thereof face in opposite directions. The discs 7 of each main gang section are mounted on a square shaft 8 rotating with the discs, the latter being held in spaced relation thereon by spacing sleeves or spools 9 between the discs. The shaft 8 is journalled in bearings 11 (only the inner bearing of each gang being shown) located at spaced points longitudinally of the same, a bearing being preferably disposed under each one of the cross bars 6, for mounting attachment thereto.

The inner end of each bearing is formed with an upwardly extending flange 12 to which are bolted pairs of depending bars 13. Referring to Figure 2 it will be seen that the lower ends of said bars are bolted to the flange 12 at points spaced to each side of the vertical axial plane of the bearing, and these bars diverge upwardly to their points of attachment to the cross bar 6, whereby they effectively carry the fore and aft stresses acting transversely of the gang frame.

Referring particularly to Figure 1, it will also be seen that each companion pair of bars 13 is secured to opposite sides of the flange 12 and extend upwardly therefrom to the cross bar 6 in spaced relation so that they effectively carry stresses acting longitudinally of the gang frame. Each bearing 11 is additionally reinforced by a post 14 which screws into a threaded boss 15 projecting upwardly from the bearing, the post extending vertically therefrom and being secured at its upper end to the adjacent cross bar 6, either by extending through an opening in the cross bar or by being attached to a bracket 6' secured thereto. Each post is tubular for conveying lubricant from an upper lubricant fitting 16 down to the bearing surfaces of the bearing 11. The post 14 at the inner end of each gang constitutes a vertical pivot axis through which the draft forces are transmitted from the central draft means, generally indicated at C, to the inner end of the gang.

Since this central draft means C in conjunction with the general structure of the improved harrow constitutes the subject matter of the copending application above noted, only such portions thereof will be generally referred to hereinafter as will aid in the disclosure of the instant invention.

The draft means C generally comprises a bar 17, the rear end of which is rigidly connected to a pivotal yoke comprising two arms 18 each of which has a bearing portion 19 through which the tubular members 14 pass. A supporting bar 21, rigidly connected to the bar 17 and arms 18, extends upwardly therefrom and is secured to a yoke plate (not shown) which carries fulcrumed thereto, bell crank levers 21 and 22, the rearwardly extending arms 23 and 24 of which pivotally engage the tubular members 14 and are held thereon by securing members 25. A spring guide rod 26 has a coil spring 27 confined thereon, and with bell crank levers 21 and 22 forms a part of the improved adjustable spring mechanism which resists upward thrust between the inner ends of the gang, as particularly pointed out in the above mentioned copending application. As shown in Figure 2, the discs of each gang section are provided with individual scrapers 28.

Coming now to the bearing construction 11, the structure thereof is unique in that the thrust sustaining surfaces are spaced inwardly from the ends of the bearings and hence are practically inaccessible to dirt and grit. The several bearings for both gangs are all duplicates, each being constructed of upper and lower housing sections having laterally projecting flanges 29 bolted together as indicated at 29'.

The spacing sleeve or spool 31 extending through the bearing is specially formed with a rotating bearing surface 32, from the central portion of which projects an annular radial flange or collar 33.

Referring to Figure 2, it will be seen that the interior of the bearing housing is polygonal in cross section, and mounted in its polygonal bore are semi-cylindrical bearing blocks 34, the outer surfaces of which are also polygonal to hold the same against rotation in the housing. The bearing blocks are disposed in pairs on opposite sides of the central thrust collar 33, the ends of the blocks bearing against the sides of the thrust collar and functioning as radial thrust surfaces for carrying the end thrust set up in the shaft 8. The blocks are held against displacement from the ends of the bearing housing by inwardly turned flanges 35 at the end of the housing which embrace the ends of the block. The rotating bearing surfaces 32 of the spacing sleeve or spool 31 on either side of the thrust collar 33 are formed with one or more helical grooves 36, which are spiralled in a direction tending to convey any particles of dirt outwardly toward the outer ends of the bearings. Thus with the forward rotation of the discs, in the forward travel of the implement, these grooves act continuously to convey any particles of dirt outwardly, away from the thrust surfaces between the ends of the bearing blocks 34 and the sides of the thrust collar 33.

The bearing blocks 34 may be constructed of a soft bearing metal, but I find it preferable to construct the same of wood. These become thoroughly saturated with lubricant, and have a further advantage of being replaceable at a minimum cost. The lubricant passing down through the adjacent post 14, enters an annular groove 37 formed in the interior of the bearing housing adjacent the thrust collar 33, whereby the lubricant is fed directly to both sides of the thrust collar. Formed in the rotating bearing surfaces 32 on each side of the thrust collar 33 are grooves 38 which aid in distributing the lubricant. Preferably, the inner ends of the helical grooves 36 do not extend to the grooves 38 or to the thrust collar 33, so that dirt cannot reach the thrust surfaces through said grooves 36.

The curvature of the flange ends of the spacing sleeve or spool 31 is so proportioned and formed with respect to the formation of the inwardly turned flanges 35 that there is a minimum tendency for dirt to gain access to the ends of the bearing. That is to say, the space indicated at 39 between the inwardly flanged end 35 of the bearing housing and the adjacent surface of the head of the spool 31 is formed on a taper with the widening part of the taper extending outwardly away from the shaft. Hence dirt thrown up by the discs above the bearing cannot work its way into the end of the bearing readily because the taper converges in this direction, whereas when this dirt revolves around to the under side of the shaft it can fall out very readily because the taper diverges in this outward direction.

Thus it will be seen that I have provided durable and efficient bearings for the axles of disc gangs, which will not only efficiently support the varying loads carried, and take up end thrust transmitted to the axle incident to the diagonal line of drag of the discs through the ground, but will also be well lubricated at all times as well as excluding all the dirt, which might tend to accumulate at the bearings, by conveying particles of dirt outwardly toward the outer ends of the bearings away from the thrust surfaces. The bearing blocks 34 absorb and retain the lubricant for long periods of use, and can be easily and cheaply replaced. The bearing is reversible so that it is universally adaptable to use at any point in the harrow, being capable of sustaining end thrust in either direction. The blocks 34 are also reversible between the ends of the bearing thereby accommodating shifting of the blocks which might be desirable from unequal thrust wear.

While I have disclosed a preferred embodiment of my invention, I do not wish to limit myself thereto. As will be understood by those skilled in the art, changes may be made therein without departing from the spirit and the scope of the appended claims.

What I claim is:

1. In a disc harrow, the combination with a frame and a shaft having harrow discs mounted thereon, of a bearing housing carried by said frame, said shaft extending entirely through said housing and supporting discs on opposite sides thereof, substantially cylindrical bearing surfaces rotating with said shaft within said housing, cooperating pairs of semi-cylindrical wood bearing blocks mounted in the end portions of said housing and engaging over said rotating bearing surfaces, the opposing inner ends of said pairs of bearing blocks being separated in longitudinally spaced relation, a radial flange projecting from said rotating bearing surfaces and engaging between the spaced inner ends of said pairs of bearing blocks for transmitting end thrust to the end faces thereof, and helical grooves in said substantially cylindrical bearing surfaces having a direction of lead for conveying particles of dirt outwardly towards the outer ends of said bearing blocks in the forward travel of the implement.

2. A bearing comprising a housing, a bearing sleeve in said housing, a radially extending thrust collar on said sleeve intermediate the ends of said housing, longitudinally spaced bearing blocks in said housing engaging said sleeve and the opposite sides of said collar, means on said bearing blocks cooperating with said housing to restrain said blocks from rotation, and means on the ends of said housing for retaining said blocks within said housing, said last named means and said sleeve being formed on a taper providing outwardly divergent spaces adjacent the ends of said housing whereby dirt particles tending to accumulate at the ends of the housing will be thrown off by the rotation of said sleeve relative to said housing.

3. A bearing comprising a housing, a bearing sleeve in said housing, a radially extending thrust collar on said sleeve intermediate the ends of said housing, longitudinally spaced bearing blocks in said housing engaging said sleeve and the opposite sides of said collar, means on said bearing blocks cooperating with said housing to restrain said blocks from rotation, and flanged means on the ends of said housing for retaining said blocks within said housing, said bearing sleeve having flared ends adjacent said flange means, said last named means being formed on a taper axially thereof providing outwardly diverging spaces between said last named means and said flared ends whereby dirt particles tending to accumulate in said spaces will be thrown off by the rotation of said sleeve relative to said housing.

4. A bearing comprising a housing, a bearing sleeve in said housing, a radially extending thrust collar on said sleeve intermediate the ends of said housing, bearing blocks in said housing engaging said sleeve and said collar, means on said bearing blocks cooperating with said housing to restrain said blocks from rotation, means at the ends of said housing for retaining said blocks within said housing, an oil conducting port in said housing leading to said collar, peripheral oil grooves adjacent the base of said collar, helical grooves in said sleeve on either side of said collar for conveying dirt particles to the ends of said housing, and flanges at the ends of said housing for retaining said bearing blocks within said housing, said flanges and adjacent outwardly extending ends of said sleeve being formed on a taper providing outwardly divergent spaces adjacent the ends of said housing whereby dirt particles tending to accumulate at the ends of said housing will be thrown off by the rotation of said sleeve relative to said housing.

5. A bearing comprising a housing, a bearing sleeve in said housing, a radially extending thrust collar on said sleeve intermediate the ends of said housing, bearing blocks in said housing engaging said sleeve and said collar, means on said bearing blocks cooperating with said housing to restrain said blocks from rotation, means at the ends of said housing for retaining said blocks within said housing, an oil conducting port in said housing leading to said collar, peripheral oil grooves adjacent the base of said collar, helical grooves in said sleeve on either side of said collar for conveying dirt particles to the ends of said housing, and flanges at the ends of said housing for retaining said bearing blocks within said housing, said sleeve having outwardly flared ends adjacent the ends of said housing, said flanges being formed on a taper, axially thereof, said flanges and flared ends providing outwardly diverging spaces between them adjacent the ends of said housing whereby dirt particles thrown up to the bearing housing ends and dirt particles conveyed to the housing ends by said helical grooves and tending to accumulate at the housing ends will be thrown off by the rotation of the sleeve relative to the housing.

6. In a bearing structure of the class described, the combination of a bearing housing, a rotary member in said housing, means providing cylindrical bearing surfaces on the rotary member, cooperating pairs of semi-cylindrical bearing blocks mounted between the ends of said housing and engaging said bearing surfaces on said rotatable member, the opposing inner ends of said pairs of bearing blocks being separated in longitudinally spaced relation, a thrust collar on said rotary member within the housing and disposed outwardly between the opposing inner ends of said pairs of bearing blocks and transmitting the thrust loads of said rotary member to the end spaces of said blocks, and means serving as a groove on the interior surface of said bearing housing adjacent said thrust collar for directing lubricant to both sides thereof.

7. In a disc harrow, the combination with a frame and a shaft having harrow discs mounted thereon, of a bearing housing carried by said frame, said housing comprising a pair of cooperating semi-cylindrical parts connected together about said shaft along an axial plane, substantially cylindrical bearing surfaces rotating with said shaft within said housing, cooperating pairs of semi-cylindrical bearing blocks mounted between the ends of each of said housing parts and engaging over said rotating bearing surfaces, the opposing inner ends of said pairs of bearing blocks being separated in longitudinal spaced relation, a radial flange disposed within said housing parts and projecting between the spaced inner ends of said pairs of bearing blocks for transmitting end thrust to the end faces thereof, the outer ends of said pairs of bearing blocks being embraced by inwardly directed flanges on the extreme ends of each of the housing parts for retaining them in said housing, the exterior periphery of said bearing blocks being non-circular and cooperating with said housing parts to restrain said blocks from rotation, and a groove formed on the inner surface of the bearing housing adjacent the position of the radial flange, said groove being wider than said flange and serving to direct lubricant to both sides thereof.

CHARLES H. WHITE.